(12) United States Patent
Haeupler et al.

(10) Patent No.: US 9,998,406 B2
(45) Date of Patent: *Jun. 12, 2018

(54) METHOD AND APPARATUS FOR PERFORMING FINITE MEMORY NETWORK CODING IN AN ARBITRARY NETWORK

(71) Applicant: Massachusetts Institute of Technology, Cambridge, MA (US)

(72) Inventors: Bernhard Haeupler, Boston, MA (US); Muriel Medard, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/843,358

(22) Filed: Sep. 2, 2015

(65) Prior Publication Data

US 2016/0006676 A1   Jan. 7, 2016

Related U.S. Application Data

(63) Continuation of application No. 13/761,799, filed on Feb. 7, 2013, now Pat. No. 9,160,687.
(Continued)

(51) Int. Cl.
*H04L 12/879* (2013.01)
*H04L 12/861* (2013.01)
(Continued)

(52) U.S. Cl.
CPC .......... *H04L 49/901* (2013.01); *H04L 1/0057* (2013.01); *H04L 1/0077* (2013.01);
(Continued)

(58) Field of Classification Search
CPC . H04L 47/50; H04L 2001/0097; H04L 49/90; H04L 49/901; H04L 49/9094; H04L 49/9057; H04L 1/0057; H04L 1/0077
(Continued)

(56) References Cited

U.S. PATENT DOCUMENTS 5,577,056 A    11/1996  Malik et al.
6,128,773 A    10/2000  Snider
(Continued)

FOREIGN PATENT DOCUMENTS

EP          1 638 239 A1    3/2006
WO    WO 2007/109216 A1    9/2007
(Continued)

OTHER PUBLICATIONS

U.S. Appl. No. 13/654,953, filed Oct. 18, 2012, Zeger, et al.
(Continued)

*Primary Examiner* — Michael Thier
*Assistant Examiner* — Rownak Islam
(74) *Attorney, Agent, or Firm* — Daly, Crowley, Mofford & Durkee, LLP

(57) ABSTRACT

Techniques for performing finite memory network coding in an arbitrary network limit an amount of memory that is provided within a node of the network for the performance of network coding operations during data relay operations. When a new data packet is received by a node, the data stored within the limited amount of memory may be updated by linearly combining the new packet with the stored data. In some implementations, different storage buffers may be provided within a node for the performance of network coding operations and decoding operations.

28 Claims, 5 Drawing Sheets

Related U.S. Application Data

(60) Provisional application No. 61/599,224, filed on Feb. 15, 2012.

(51) Int. Cl.
H04L 1/00 (2006.01)
H04L 12/863 (2013.01)

(52) U.S. Cl.
CPC .......... H04L 49/90 (2013.01); H04L 49/9057 (2013.01); H04L 49/9094 (2013.01); H04L 47/50 (2013.01); H04L 2001/0097 (2013.01)

(58) Field of Classification Search
USPC ........................................................ 370/412
See application file for complete search history.

(56) References Cited

U.S. PATENT DOCUMENTS

| | | | |
|---|---|---|---|
| 6,621,851 B1 | 9/2003 | Agee et al. | |
| 6,885,653 B2 | 4/2005 | Choi et al. | |
| 7,064,489 B2 | 6/2006 | Price | |
| 7,071,853 B2 | 7/2006 | Price | |
| 7,095,343 B2 | 8/2006 | Xie et al. | |
| 7,164,691 B2 | 1/2007 | Knapp et al. | |
| 7,283,564 B2 | 10/2007 | Knapp et al. | |
| 7,349,440 B1 | 3/2008 | Chou et al. | |
| 7,408,938 B1 | 8/2008 | Chou et al. | |
| 7,414,978 B2 | 8/2008 | Lun et al. | |
| 7,529,198 B2 | 5/2009 | Jain et al. | |
| 7,706,365 B2 | 4/2010 | Effros et al. | |
| 7,760,728 B2 | 7/2010 | Chou et al. | |
| 7,821,980 B2 | 10/2010 | Chakrabarti et al. | |
| 7,876,677 B2 | 1/2011 | Cheshire | |
| 7,912,003 B2 | 3/2011 | Radunovic et al. | |
| 7,945,842 B2 | 5/2011 | He | |
| 8,040,836 B2 | 10/2011 | Wu et al. | |
| 8,068,426 B2 | 11/2011 | Sundararajan et al. | |
| 8,130,776 B1 | 3/2012 | Sundararajan et al. | |
| 8,279,781 B2 | 10/2012 | Lucani et al. | |
| 8,451,756 B2 | 5/2013 | Lucani et al. | |
| 8,482,441 B2 | 7/2013 | Medard et al. | |
| 8,504,504 B2 | 8/2013 | Liu | |
| 8,571,214 B2 | 10/2013 | Lima et al. | |
| 2003/0055614 A1 | 3/2003 | Pelikan | |
| 2003/0214951 A1 | 11/2003 | Joshi et al. | |
| 2004/0203752 A1 | 10/2004 | Wojaczynski et al. | |
| 2005/0010675 A1 | 1/2005 | Jaggi et al. | |
| 2005/0078653 A1 | 4/2005 | Agashe et al. | |
| 2005/0152391 A1 | 7/2005 | Effros et al. | |
| 2005/0251721 A1 | 11/2005 | Ramesh et al. | |
| 2006/0020560 A1 | 1/2006 | Rodriguez et al. | |
| 2006/0146791 A1 | 7/2006 | Deb et al. | |
| 2006/0146830 A1* | 7/2006 | Lin ...................... | H04N 19/172 370/394 |
| 2006/0224760 A1 | 10/2006 | Yu et al. | |
| 2007/0046686 A1 | 3/2007 | Keller | |
| 2007/0116027 A1 | 5/2007 | Ciavaglia et al. | |
| 2007/0274324 A1 | 11/2007 | Wu et al. | |
| 2008/0043676 A1 | 2/2008 | Mousseau et al. | |
| 2008/0049746 A1 | 2/2008 | Morrill et al. | |
| 2008/0123579 A1 | 5/2008 | Kozat et al. | |
| 2008/0259796 A1 | 10/2008 | Abousleman et al. | |
| 2008/0275928 A1* | 11/2008 | Shuster ................. | G06F 3/0607 |
| 2008/0291834 A1 | 11/2008 | Chou et al. | |
| 2008/0320363 A1 | 12/2008 | He | |
| 2009/0003216 A1 | 1/2009 | Radunovic et al. | |
| 2009/0135717 A1 | 5/2009 | Kamal et al. | |
| 2009/0153576 A1 | 6/2009 | Keller | |
| 2009/0168620 A1 | 7/2009 | Bliss et al. | |
| 2009/0175320 A1 | 7/2009 | Haustein et al. | |
| 2009/0198829 A1 | 8/2009 | Sengupta et al. | |
| 2009/0207930 A1 | 8/2009 | Sirkeci et al. | |
| 2009/0238097 A1 | 9/2009 | Le Bars et al. | |
| 2009/0248898 A1 | 10/2009 | Gkantsidis et al. | |
| 2009/0285148 A1 | 11/2009 | Luo et al. | |
| 2009/0310582 A1 | 12/2009 | Beser | |
| 2009/0313459 A1 | 12/2009 | Horvath | |
| 2009/0316763 A1 | 12/2009 | Erkip et al. | |
| 2010/0014669 A1 | 1/2010 | Jiang | |
| 2010/0046371 A1 | 2/2010 | Sundararajan et al. | |
| 2010/0057636 A1 | 3/2010 | Brennan | |
| 2010/0080290 A1* | 4/2010 | Mehrotra ............. | H04N 19/147 375/240.07 |
| 2010/0111165 A1 | 5/2010 | Kim et al. | |
| 2010/0146357 A1 | 6/2010 | Larsson | |
| 2010/0220644 A1 | 9/2010 | Reznik et al. | |
| 2011/0218769 A1 | 9/2011 | Handa | |
| 2011/0238855 A1 | 9/2011 | Korsunsky et al. | |
| 2012/0128009 A1* | 5/2012 | Yang .................. | H03M 13/2906 370/432 |
| 2012/0218891 A1 | 8/2012 | Sundararajan et al. | |
| 2012/0300692 A1 | 11/2012 | Sfar et al. | |
| 2013/0107764 A1 | 5/2013 | Zeger et al. | |
| 2013/0114481 A1 | 5/2013 | Kim et al. | |
| 2013/0114611 A1 | 5/2013 | Zeger et al. | |
| 2013/0195106 A1 | 8/2013 | Calmon et al. | |
| 2014/0064896 A1 | 3/2014 | Haeupier et al. | |
| 2014/0185803 A1 | 7/2014 | Lima et al. | |
| 2014/0268398 A1 | 9/2014 | Medard et al. | |
| 2014/0269485 A1 | 9/2014 | Medard et al. | |
| 2014/0269503 A1 | 9/2014 | Medard et al. | |
| 2014/0269505 A1 | 9/2014 | Medard et al. | |
| 2014/0280395 A1 | 9/2014 | Medard et al. | |
| 2014/0280454 A1 | 9/2014 | Medard et al. | |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
Abichar, et al.; "WiMax vs. LTE: Who Will Lead the Broadband Mobile Internet?;" Mobile Computing IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. 1$^{st}$ Workshop on Network Coding, Theory, and Application (Netcod'05); Apr. 2005; 6 pages.
Adamson, et al.; "Multicast Negative-Acknowledgement (NACK) Building Blocks;" Internet Engineering Task Forse (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.

(56) References Cited

OTHER PUBLICATIONS

Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communication Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1, No. 2; Apr. 2002; pp. 292-301.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Prof. of the $25^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; pp. 1748-1752.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; OCt. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms Discrete Mathematics; Aug. 17, 2020; pp. 1-16.
Castro, et al.; "Upper and Lower Error Bounds for Active Learning;" The 44'th Annual Allerton Conferences on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; ICM'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proc. of the $41^{st}$ Allerton Conference on Communication Control and Computing; vol. 41; Oct. 2003; pp. 40-49.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
"Data Service Options for Spread Spectrum Systems: Radio Link Protocol Type 3;" 3GPP2 C S0017-010-A; Version 2.0; Sep. 2005.
Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.
Deb, et al.; "On Random Network Coding Based Information Dissemination;" Proc. of the IEEE International Symposium on Information Theory (ISIT); Sep. 4-9, 2005; pp. 278-282.
Deb, et al.; "On Random Network Coding Based Information Dissemination;" Proc. of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jna. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.

(56) References Cited

OTHER PUBLICATIONS

Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and-Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 $40^{th}$ Annual Conference on Mar. 22-24, 2006; 7 pages.
Fans, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; $48^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks," $47^{th}$ Annual Allerton Conference, IEEE; Sep. 30, 2009; pp. 447-454.
Feizi, et al.; "Cases Where Finding a Minimum Entropy Coloring of a Characteristic Graph is a Polynomial Time Problem;" IEEE International Symposium on Information Theory; Jun. 13, 2010; pp. 116-120.
Femer, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al,; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The $27^{th}$ Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Georghiu, et al.; "On the Performance of Network Coding in Multi-Resolution Wireless Video Streaming;" IEEE International Symosium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
"Guest Editorial Wireless Video Transmission;" IEEE Journal on Selected Areas in Communications; vol. 28; No. 3; Apr. 2010; pp. 297-298.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near-Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; pp. 1151-1155.
Haeupler, et al.; "Optimality of Network Coding in Packet Networks;" 2011 IEEE Information Theory Workshop (ITW) Proceedings; Oct. 2011; pp. 533-537.
Haeupler, et al.; "Optimality of Network Coding in Packet Networks;" ArXiv, Feb. 17, 2011; 5 pages.
Haeupler; "Analyzing Network Coding Gossip Made Easy;" Proc. of the $43^{rd}$ Symposium on Theory of Computing (STOC); Jan. 2011, 13 pages.
Haley, et al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Network Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Hauepler, et al.; "Optimality of Network Coding in Packet Networks;" ArXiv; Feb. 17, 2011; 5 pages.
Ho, et al.; "A Random Linear Network Coding Approach to Multicast;" IEEE Transactions on Information Theory; vol. 52; No. 10; Oct. 2006; pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of $41^{st}$ Annual Allerton Conference on Communications, Control and Computer; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Hofri; "Disk Scheduling: FCFS vs. SSTF Revisited;" Communications of the ACM; vol. 23; No. 11; Nov. 1980; pp. 645-653.

(56) References Cited

OTHER PUBLICATIONS

Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Joifaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colioquium on Computation Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in the Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughput: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Networking Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et al.; "Modeling Network Coded TCP Throughput: A Simple Model and its Validation", arXiv: 1008.0420v1 [cs.IT] Aug. 2, 2010; 9 pages.
Kim, et al.; "Modeling Network Coded TCP Throughput: A Simple Model and its Validation", Nov. 2010, Presentation; 19 pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11; No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;"Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{nd}$ Symposium on Theory of Computing (STOC); Jun. 5-8, 2010; pp. 557-570.
Lai; "Sequential Analysis: Some Classical Problems and New Challenges"; Statistica Sinica, vol. 11, No. 2, 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006—Spring); IEEE $63^{rd}$; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "Linear Network Coding;" IEEE Transactions on Information Theory; vol. 49; No. 2; Feb. 2003; pp. 371-381.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.

(56) References Cited

OTHER PUBLICATIONS

Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al; "Broadcasting in Time-Division Duplexing: A Random Linear Network Coding Approach;" presented Switzerland; Conference: NetCod 2009, Lausanne, Switzerland; Jun. 2009; 6 pages.
Lucani et al.; "On Coding for Delay New Approaches based on Network Coding in Network Coding in Networks with Large Latency;" Presentation in NetCod; Slide Presendation; Jun. 16, 2009; 17 pages.
Lucani et al.; "On Coding for Delay—New Approaches Baed on Network Coding in Networks with Large Latency;" Conference: ITA Workshop, San Diego, USA; Feb. 2009; 10 pages.
Lucani et al; "On Coding for Delay New Approaches based on Network Coding in Networks with Large Latency;" Conference ITA Workshop, San Diego, USA; Slide Presentation; Feb. 13, 2009; 11 pages.
Lucani et al; "Random Linear Network Coding for Time Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding for Data Dissemination: It is Not What You Know, But What Your Neighbors Don't Know;" Modeling and Optimization in Mobile, AdHoc, and Wireless Networks 2009; WiOPT 2009; 7$^{th}$ International Symposium on Jun. 23-27, 2009; pp. 1-8.
Lucani, et al.; "Network Coding Schemes for Underwater Networks;" WUWNet 07; Sep. 14, 2007; pp. 25-32.
Lucani, et al.; Systematic Network Coding for Time-Division Duplexing; Proceedings of the IEEE International Symposium on Information Theory (ISIT); ; Jun. 13-18, 2010; pp. 2403-2407.
Lun, et al.; "Further Results on Coding for Reliable Communication Over Packt Networks;" Proc. of the IEEE International Symposium on Information Theory (ISIT); Sep. 4-9, 2005; pp. 1848-1852.
Lun, et al.; "On Coding for Reliable Communication Over Packet Networks;" Physical Communication; vol. 1, No. 1; Jan. 2008; pp. 3-20.
Lun, et al.; "On Coding for Reliable Communication Over Packte Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 133 pages.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. of the 44$^{th}$ Allerton Conference on Communication, Control, and Computing; Sep. 2006; 10 pages.
Médard, et al,, "On Coding for Non-Multicast Networks;" invited paper, 41$^{st}$ Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 367-373.
Metzner; "An Improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2008; pp. 1748-1752.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al,; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.
Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008.
ParandehGheibi, et al.; "Access-Network Association Policies for Media Streaming in Heterogeneous Environments;" Apr. 2010; pp. 1-8.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popovici, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE 20$^{th}$ International Symposium on Sep. 13-16, 2009; 5 pages.

(56) References Cited

OTHER PUBLICATIONS

Radunovic, et al.; "Horizon: Balancing TCP Over Multiple Paths in Wireless Mesh Network;" Proc. 14th ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et al.; "Multi Packet Reception and Network Coding;" Presentation at The 2010 Military Communications Conference Unclassified Technical Program; Nov. 2, 2010; 15 pages.

Rezaee, et al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optical Slotted Random Access in Coded Wireless Packet Networks;" WiOPt 10; Modeling and Optimization in Mobile, Ad Hoc, and Wireless Networks; Jul. 13, 2010; pp. 374-379.

Roughgarden, et al.; "How Bad is Selfish Routing?" Journal of the ACM; vol. 49, No. 2; Mar. 2002; pp. 236-259.

Ruemmler, et al.; "An introduction to disk drive modeling;" IEEE Computers; vol. 27; No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" 15th ACM Symposium on Parallel Algorithms and Architectures; Jun. 2003; pp. 1-9.

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless;" Packet Video; Nov. 2007; 10 pages.

Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.

Servetto, et al.; "Constrained Random Walks on Random Graphs: Routing Algorithms for Large Scale Wireless Sensor Networks;" WSNA 02; SEp. 28, 2002; 10 pages.

Shenker, et al.; "Pricing in computer networks: reshaping the research agenda;" Telecommunications Policy; vol. 20, No. 3; Jan. 1996; pp. 183-201.

Sherali, et al.; "Recovery of primal solutions when using subgradient optimization methods to solve Langrangian duals of linear programs;" Elsevier Operations Research Letters 19 (Jan. 1996); pp. 105-113.

Shields; "The Interactions Between Ergodic Theory and Information Theory;" IEEE Transactions on Information Theory, vol. 44, No. 6; Oct. 1998; pp. 2079-2093.

Shrader, et al.; "Systematic wireless network coding;" Military Conference, 2009; MILCOM 2009; IEEE; 7 pages.

Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.

Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4.

Soo Suh; "Send-On-Delta Sensor Data Transmission With a Linear Predictor," Sensors; ISSN 1424-8220; vol. 7; No. 4; Apr. 26, 2007; pp. 537-547.

Sun, et al.; "Cooperative Hybrid-ARQ Protocol with Network Coding;" Communications and Networking in China 2009—chinaCOM 2009; Fourth International Conference on Aug. 26-28, 2009; pp. 1-5.

Sundaram, et al.; "Multirate Media Streaming Using Network Coding;" Proc. 43rd Allerton Conference on Communication, Control, and Computing; Sep. 2005; 7 pages.

Sundararajan, et al.; "ARQ for Network Coding;" ISIT Proc. of the IEEE International Symposium on Information Theory (ISIT); Jul. 6-11, 2008; pp. 1651-1655.

Sundararajan, et al.; "Network Coding Meets TCP: Theory and Implementation;" Proceedings of the IEEE; vol. 99, Issue 3; Mar. 2011; pp. 490-512.

Sundararajan, et al., "Network coding meets TCP;" InfoCOM 2009; IEEE, Apr. 19-25, 2009; pp. 280-288.

Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.

Teerapittayanon, et al.; "Network Coding as a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generation Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; 7th International ITG Conference on Jan. 14-16, 2008; 6 pages.

Torobkhani et al.; "Exact Modeling of the Performance of Random Linear Network Coding in Finite-buffer Networks;" IEEE Information Theory Workshop; Oct. 2011; p. 538-542.

Tosun, et al.; "Efficient Multi-Layer Coding and Encryption of MPEG Video Streams;" Proc. 2000 IEEE International Conference on Multimedia and Expo; vol. 1; 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 685-698.

Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.

Trung, et al.; "Quality Enhancement for Motion JPEG Using Temporal Redundancies;" IEEE Transactions on Circuits and System for Video Technology, vol. 18; No. 5; May 2008; pp. 609-619.

Tsatsanis, et al.; "Network Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

(56) References Cited

OTHER PUBLICATIONS

Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VCT2011-Spring); May 2011; 5 pages.
Vien, et al.; "Netwok Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interface in Ad Hoc Networks Using Joint Routing and Scheduling with Multiple Packet Reception;" in INFOCOM 2008; The $27^{th}$ Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilheim; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; "Towards Zero Retransmission Overhead: A Symbol Level Network Coding Approach to Retransmission;" IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 The $28^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On anallyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
Office Action dated Nov. 6, 2014; for U.S. Appl. No. 13/761,799; 69 pages.
Response filed Feb. 4, 2015; to Office Action dated Nov. 6, 2014; for U.S. Appl. No. 13/761,799; 24 pages.
Final Office Action dated May 21, 2015; for U.S. Appl. No. 13/761,799; 35 pages.
Response to Final Office Action filed Jun. 25, 2015; to Final Office Action dated May 21, 2015; for U.S. Appl. No. 13/761,799; 13 pages.
Notice of Allowance dated Jul. 23, 2015; for U.S. Appl. No. 13/761,799; 17 pages.
U.S. Appl. No. 14/882,115, filed Aug. 10, 2015, Lima, et al.
U.S. Appl. No. 14/826,256, filed Aug. 14, 2015, Zeger, et al.

* cited by examiner

METHOD AND APPARATUS FOR PERFORMING FINITE MEMORY NETWORK CODING IN AN ARBITRARY NETWORK

CROSS REFERENCE TO RELATED APPLICATION

The present application is a continuation of, and claims the benefit under 35 U.S.C. § 120 of the filing date of, co-pending U.S. patent application Ser. No. 13/761,799, filed on Feb. 7, 2013, which claims the benefit of U.S. Provisional Patent Application No. 61/599,224 filed on Feb. 15, 2012, the teachings of which are incorporated by reference herein in their entireties.

GOVERNMENT RIGHTS

This invention was made with government support under Contract No. N66001-11-C-4003 awarded by the Space and Naval Warfare Systems Command. The government has certain rights in the invention.

FIELD

The subject matter disclosed herein relates generally to information transfer and, more particularly, to distribution of data among a plurality of nodes using network coding.

BACKGROUND

Network coding is a technique that may be used in a wireless or wired network to improve the information flow of the network. In a conventional network, a node acting as a relay node will typically forward packets (or messages) in the network by re-transmitting the packets in the form that they were received. In a network that uses network coding, on the other hand, relay nodes may combine a number of received packets together into a coded packet before forwarding the coded packet in the network. A node in the network that receives the coded packet may then store the coded packet for eventual decoding. Random linear network coding (RLNC) is a form of network coding that uses randomly generated coefficients to form linear combinations of packets to be forwarded in a network. RLNC has been shown to be a powerful technique for achieving robust, high throughput multi-cast packet distribution in certain network environments. However, RLNC can require some nodes in a network to maintain a considerable amount of data in a local memory to support coding operations. In many instances a node may be called upon to store every packet it has received. In addition, as the amount of packet data stored in a node increases, the computational complexity of the coding operation may increase by a proportional amount. There is a general need for techniques that are capable of reducing the memory requirements and/or computational complexity of implementing RLNC and/or other forms of network coding in arbitrary networks.

SUMMARY

Techniques are disclosed herein that are capable of reducing the memory requirements and/or computational complexity required to perform network coding in an arbitrary network or system. In some implementations, a network node may provide only a limited amount of memory space for performing network coding. For example, a network node may only allow a finite number of packets to be stored in the node for use in performing network coding operations (e.g., S packets, where S is a positive integer). In at least one implementation, a network node may include both a coding buffer and a decoding buffer. The coding buffer may be provided to support network coding operations for the node when used as a relay node and the decoding buffer to support decoding operations for the node when used as a destination node. In some implementations, the decoding buffer may store every packet received by the node for use in packet decoding, while the coding buffer only stores a limited, finite number of packets for coding purposes. If a node is not interested in decoding data, it can include only a coding buffer and not a decoding buffer (or deactivate a decoding buffer if present).

Because only a finite number of packets are stored for network coding purposes, the complexity of network coding operations may be significantly reduced. For example, in a network that practices random linear network coding (RLNC), the coding function generally requires all packets stored for coding purposes to be retrieved from memory and processed to generate a packet to be transmitted by the node. By limiting the number of packets that are stored for coding purposes, fewer packets may have to be retrieved and processed to generate a coded packet for transmission. In addition, because fewer packets are retrieved, less random coefficients need to be generated during the network coding process, resulting in a further reduction in computational complexity. Because less memory is required for coding purposes, a lower capacity, faster form of memory may be used for the coding buffer in some implementations.

In accordance with one aspect of the concepts, systems, circuits, and techniques described herein, a machine implemented method for operating a network node in a memory efficient manner in a network having a plurality of nodes that does not use pre-established routing to direct packets through the network, comprises: (a) receiving a new packet at the network node from an arbitrary direction; (b) modifying contents of a coding buffer of the network node using the new packet, the coding buffer for use in performing network coding for the network node, the coding buffer to store no more than S packets for use in network coding, where S is a positive integer, wherein modifying the contents of the coding buffer includes linearly combining the new packet with packets already stored in the coding buffer to generate modified packets and storing the modified packets in the coding buffer; (c) generating a new packet to be transmitted from the network node after modifying contents of the coding buffer, wherein generating a new packet includes linearly combining packets stored in the coding buffer using network coding; and (d) transmitting the new packet to one or more possibly unknown other nodes.

In accordance with another aspect of the concepts, systems, circuits, and techniques described herein, a node device for use in an network having a plurality of nodes that does not use pre-established routing to direct packets through the network, comprises: (a) a receiver to receive data packets from a surrounding environment, wherein packets can be received from any arbitrary direction in the network; (b) a coding buffer to store packets received from the surrounding environment for use in network coding, the coding buffer to store no more than S packets for use in network, coding, where S is a positive integer; (c) a buffer content modifier to modify contents of the coding buffer when a new data packet is received from the surrounding environment; (d) a network encoder to generate, using network coding, a coded packet for transmission from the node device using packet data stored in the coding buffer; and (e) transmitter to transmit the coded packet to one or more possibly unknown other nodes.

In accordance with a still another aspect of the concepts, systems, circuits, and techniques described herein, an apparatus is provided that includes a computer readable storage medium having instructions stored thereon that, when executed by one or more processors of a computing system, operate to perform a method for operating a node in a network having a plurality of nodes that does not use pre-established routing to direct nodes through the network. More specifically, the method comprises; (a) obtaining a new packet at the node, the new packet having been received at the node from an arbitrary direction; (b) modifying contents of a coding buffer of the node using the new packet, the coding buffer for use in performing network coding at the node, the coding buffer to store no more than S packets for use in network coding, were S is a positive integer, wherein modifying the contents of the coding buffer includes linearly combining the new packet with packets stored in the coding buffer to generate modified packets and storing the modified packets in the coding buffer; (c) generating a new packet to be transmitted from the node, wherein generating a new packet includes linearly combining data stored in the coding buffer using network coding; and (d) causing the new packet to be transmitted from the node to one or more possibly unknown other nodes.

In accordance with a further aspect of the concepts, systems, circuits, and techniques described herein, a node device is provided for use in a network having a plurality of nodes where, at any one time, the plurality of nodes can include multiple source nodes, multiple destination nodes, and multiple relay nodes to relay packets between source nodes and destination nodes, more specifically, the node device comprises: (a) a coding buffer to store received packets for use in performing network coding to generate new packets if the node device is being used as a relay node, the coding buffer having a small, fixed number of memory locations that can be used for storing packets for use in network coding operations; (b) a coding buffer content modifier to modify contents of the coding buffer when a new data packet is received from a surrounding environment; and (c) a decoding buffer to store received packets for use in decoding operations if the node device is being used as a destination device, the decoding buffer being different from the coding buffer, wherein the decoding buffer is to store each new packet received by the node device for use in decoding operations with no fixed limit on the number of memory locations that can be used for decoding; wherein the node device is capable of concurrent operation as two or more of: a source node, a relay node, and a destination node.

BRIEF DESCRIPTION OF THE DRAWINGS

The foregoing features may be more fully understood from the following description of the drawings in which.

DETAILED DESCRIPTION

Figure 1:
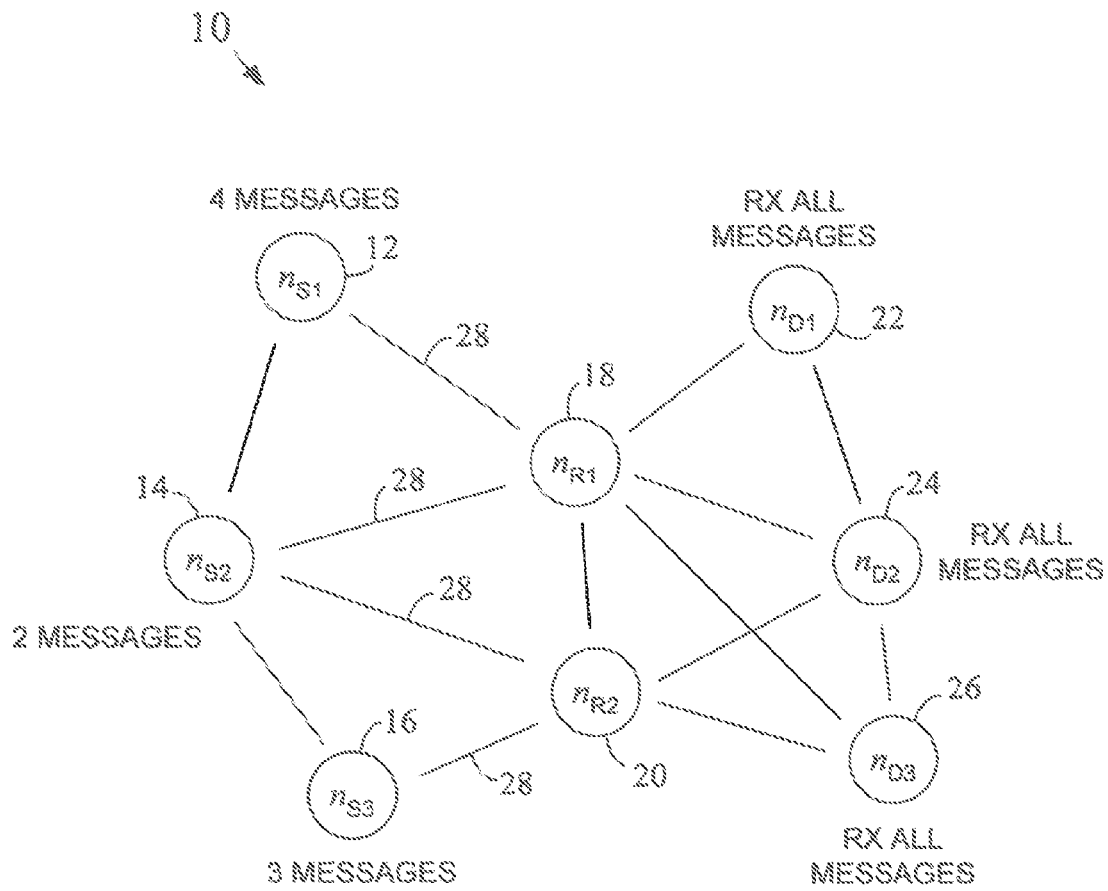
FIG. 1 is a schematic diagram illustrating an example network that may incorporate technical features described in the present disclosure.

FIG. 1 is a schematic diagram illustrating an example network 10 that may incorporate technical features described in the present disclosure. As shown, network 10 may include a number of nodes 12, 14, 16, 18, 20, 22, 24, 26 that are able to communicate with one another via links 28 between the nodes. In a typical communication scenario, one or more of the nodes 12, 14, 16, 18, 20, 22, 24, 26 may have information that needs to be distributed to some or all of the other nodes. In FIG. 1, for example, node 12, node 14, and node 16 may each have information that needs to be distributed to node 22, node 24, and node 26. As used herein, the term "source node" will refer to a node that has information to be distributed to other nodes and the term "destination node" will refer to a node that is intended to receive information. Thus, in the example network of FIG. 1, node 12, node 14, and node 16 may be source nodes and node 22, node 24, and node 26 may be destination nodes. It should be appreciated that different source nodes may have different amounts of information to be distributed to destination nodes. For example, with reference to FIG. 1, node 12 may have 4 messages to be distributed, node 14 may have 2 messages to be distributed, and node 16 may have 3 messages to be distributed. In the illustrated example, destination nodes 22, 24, 26 are each to receive all transmitted messages. To distribute messages in a network, one or more relay nodes may be used to relay messages between nodes. For example, with reference to FIG. 1, node 18 and node 20 may be used as relay nodes to relay messages from source nodes 12, 14, and 16 to destination nodes 22, 24, and 26. As used herein, the word "message" and the word "packet" may be used interchangeably.

In the network 10 of FIG. 1, all of the source nodes 12, 14, 16 are located on the left, all of the destination nodes 22, 24, 26 are located on the right, and all of the relay nodes 18, 20 are located in the middle. It should be appreciated that this scenario was used to simplify illustration and description and may not be representative of a typical network arrangement. That is, in an actual network, source nodes, destination nodes, and relay nodes may be located anywhere within the network. For example, in one scenario, node 18 in FIG. 1 may be a source node with a single message to transmit and may also wish to receive all messages in the network. Similarly, node 14 may have no messages to send, but may wish to receive all messages. Also, node 24 may have two messages to transmit, but may not want to receive any messages.

Although nodes 12, 14, 16, 18, 20, 22, 24, 26 of FIG. 1 have each been described above as being either a source node, a relay node, or a destination node, it should be understood that a single node may have multiple different purposes in a network. For example, node 18 may serve as both a relay node and a destination node in some network scenarios. Likewise, node 16 may serve as both a source node and a destination node in some situations. In a broadcast scenario, all (or most) nodes in a network may be destination nodes. In some embodiments, some or all of the nodes in a network may configured to act as both relay nodes and destination nodes (or relay nodes, destination nodes, and source nodes). It should be understood that the network 10 of FIG. 1 is merely an example of one possible network arrangement that may exist. In general, networks may have any number of different nodes and any number of different network topologies. In addition, as will be described in greater detail, the techniques and structures described herein are not limited to use within communication networks. That is, in some implementations, the techniques may be used in other types of systems that are not typically considered communication networks (e.g., data storage systems that store data in a distributed manner, etc.).

In some networks, the topology of the network may change over time. In addition, the reliability and/or capacity of the links of the network may change over time, with some links becoming unreliable or unavailable and other links becoming available that were not previously available. One typical example of such dynamics are wireless mesh networks in which availability, capacity, and reliability of node-to-node connections can vary greatly due to, for example, movement of the nodes, obstructions coming between nodes, increased contention between nodes, and other changing conditions. In such scenarios, traditional routing techniques may not be the best method for distributing messages through a network. Network coding has been suggested as an intelligent option for distributing messages in a network in certain circumstances. In network coding, combinations of different messages may be made at certain nodes of a network to generate coded packets to be forwarded in the network. Destination nodes in the network may then store received coded packets in a memory and use these stored coded packets, along with any knowledge they have of the original transmitted messages, to decode the coded packets and recover all of the originally transmitted messages.

In one type of network coding, known as random linear network coding (RLNC), relay nodes in a network may generate a coded packet to be forwarded in the network by linearly combining received messages using randomly generated coefficients. In some instances, a transmitted packet may also include an indication of the coefficients used in the linear combination. Thus, the transmitted packets may, in some implementations, have the format $(\vec{\mu}, \vec{m})$, where $\vec{m} = \sum_{i=1}^{k} \mu_i \vec{m}_i \in F_q^s$ is a linear combination of messages $\vec{m}_1, \ldots, \vec{m}_k$ and $\vec{\mu} = (\mu_1, \ldots, \mu_k) \in F_q^k$ is the vector of coefficients used to generate the linear combination. The messages $\vec{m}_1, \ldots, \vec{m}_k$ are in this case seen as s-dimensional vector over a finite field $F_q$. For example, in the case q=2 they would be bit-vectors of length s. It should be appreciated that when s is much larger than k the size s+k of a packet is dominated by the size of a message making the overhead of sending the coefficients along negligible. The coefficients $\vec{\mu}$ may be used by a destination node during, for example, a decoding process. It has been shown that network coding is capable of enhancing overall throughput and providing better performance than traditional routing techniques in certain network scenarios. One example system and method for implementing RLNC is described in U.S. Pat. No. 7,706,365 to Effros et al., entitled "Randomized Distributed Network Coding," which is incorporated by reference herein in its entirety.

In some past networks implementing RLNC, nodes operating as relay nodes to generate and forward coded packets typically stored every packet they received for use in coding. As can be appreciated, this practice may require a large amount of storage space to be reserved for coding purposes within a node. In addition, this technique may involve a relatively large computational complexity to perform network coding. In general, a network coding operation may involve reading the entire contents of a received packet memory and processing the retrieved information to generate a new coded packet. When there is a large volume of data in the memory, this processing may be very complex. This level of processing complexity may not be possible in some lower cost, lower complexity nodes having limited processing power. In addition, this high computational complexity can result in a higher power consumption within a node device that can significantly reduce battery life. In various implementations described herein, techniques and structures are provided that may reduce the memory requirements for implementing RLNC and other forms of network coding. The described techniques and structures are also capable of significantly reducing the computational complexity of implementing RLNC and other forms of network coding in a node device. In addition, the techniques and structures described herein may also provide a significant reduction in power consumption within a node device implementing RLNC in some implementations.

In various implementations, the techniques and structures described herein (i.e., finite memory network coding) may be implemented within networks that utilize a non-routing based approach to packet/message distribution. That is, the techniques may be used in networks where network nodes have little to no knowledge of when they are going to have a chance to forward packets or where the packets will be forwarded to. This is in contrast to traditional routing approaches where a next hop is selected before a packet is even transmitted. In such networks or systems, the disclosed techniques may allow nodes to keep a very small amount of information on hand for forwarding, while causing little to no degradation in packet distribution performance. It has been Shown that, in most network settings, finite memory RLNC matches the performance of conventional RLNC. In addition, it has been shown that, for large enough q, the finite memory RLNC protocol is the best method for utilizing a given buffer size (i.e., no other protocol can finish faster or transmit more information) (see, for example, "One Packet Suffices—Highly Efficient Packetized Network Coding With Finite Memory," by Haeupler et al, 2011 *IEEE International Symposium on Information Theory (ISIT) Proceedings*, pages 1151-1155, Jul. 31 2011-Aug. 5 2011 and "Optimality of Network Coding in Packet Networks," by Haeupler et al., 2011 *IEEE Information Theory Workshop (ITW) Proceedings*, pages 533-537, October 2011, both of which are incorporated by reference herein in their entireties).

Figure 2:
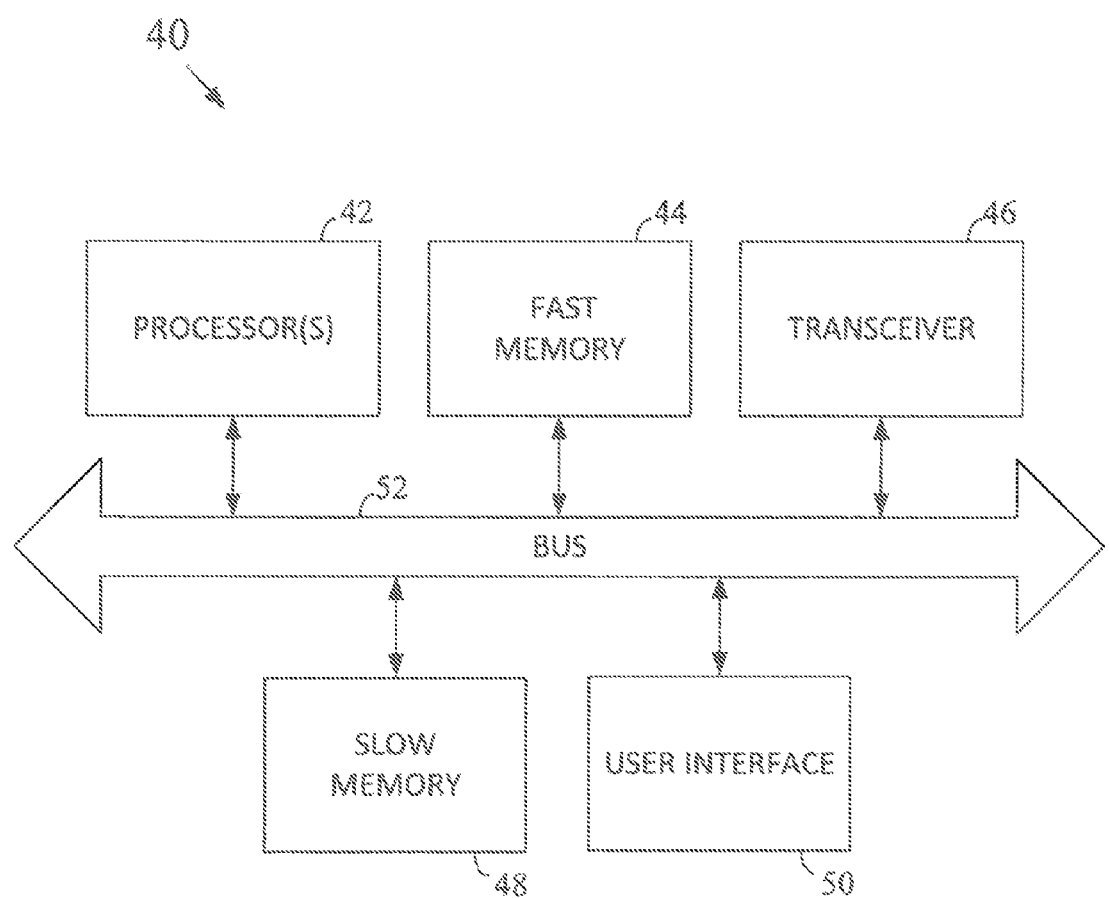
FIG. 2 is a block diagram illustrating an example node device architecture that may incorporate technical features described in the present disclosure.

FIG. 2 is a block diagram illustrating an example node device architecture 40 that may incorporate features described in the present disclosure in one or more implementations. As illustrated, the node device architecture 40 may include: one or more digital processors 42, a fast memory 44, a transceiver 46, a slow memory 48, and a user interface 50. A bus 52 and/or other structure(s) may be provided for establishing interconnections between various components of device architecture 40. Digital processor(s) 42 may include one or more digital processing devices that are capable of executing programs to provide functions and/or services to a user. Fast memory 44 and slow memory 48 are digital data storage structures that may be used to store data and/or programs for other elements of node device architecture 40. User interface 50 may include any type of device, component, or subsystem that provides an interface between a user and a corresponding node device. As will be appreciated, in some types of nodes, a user interface may not be present. Transceiver 46 may include any type of transceiver that is capable of supporting communication with one or more remote entities.

Digital processor(s) 42 may include, for example, one or more general purpose microprocessors, digital signals processors (DSPs), controllers, microcontrollers, special purpose processors, application specific integrated circuits (ASICs), field programmable gate arrays (FPGAs), programmable logic arrays (PLAs), programmable logic devices (PLDs), reduced instruction set computers (RISCs), and/or others, including combinations of the above. Digital processor(s) 42 may be used to, for example, execute an operating system of a corresponding node device. Digital processor(s) 42 may also be used to, for example, execute one or more application programs for the node device. In addition, digital processor(s) 42 may be used to implement, either partially or fully, one or more of the communications related processes or techniques described herein in some implementations.

As described above, transceiver 46 may include any type of transceiver that is capable of supporting communication with one or more remote entities. In various implementations, transceiver 46 may be configured in accordance with one or more networking standards. In some implementations, multiple transceivers may be provided to support operation in different networks or systems in a surrounding. Transceiver 46 may be capable of communicating with peer or infrastructure devices in a wireless, peer-to-peer, ad-hoc, or wired network arrangement. In some implementations, transceiver 46 may be used to implement, either partially or fully, one or more of the communications related processes or techniques described herein. It should be appreciated that the techniques described in the present disclosure may, in some embodiments, be implemented in other types of networks (e.g., memory systems, etc.).

Fast memory 44 may include one or more faster forms of digital data storage within a node device and slow memory 48 may include one or more slower forms of digital data storage in a node device. Typically, faster memory structures (e.g., flash memory, semiconductor random access memory (RAM), etc.) may have lower storage capacities and slower memory structures (e.g., a hard disk drive, etc.) may have higher storage capacities. Fast memory 44 may include, for example, one or more semiconductor memories, random access memories (RAMs), flash memories, USB drives, cache memories, erasable programmable ROMs (EPROMs), electrically erasable programmable ROMs (EEPROMs), and/or others. Similarly, slow memory 48 may include, for example, disc based storage devices, magnetic data storage devices, optical storage devices, compact disc read only memories (CD-ROMs), DVDs, Blu-Ray disks, magneto-optical disks, magnetic or optical cards, and/or others. As will be described in greater detail, the techniques described in the present disclosure may, in some implementations, allow fast memory to be used for network coding applications that may have formally been limited to slower forms of memory.

It should be appreciated that the node device architecture 40 of FIG. 2 represents one possible example of an architecture that may be used in an implementation. Other architectures may alternatively be used. As used herein, the term "node device" or "node" is used to describe any type of digital electronic device that includes some form of communication capability. This may include, for example, a laptop, desktop, notebook, or tablet computer; a personal digital assistant (PDA); a personal communication service (PCS) device; a personal navigation assistant (PNA); a cellular telephone, smart phone, or other communication device; a pager; a sensor device; a satellite communication device; a server; a router; a switch; a media player having communication capability; a digital storage device used in a distributed data storage system; and/or other devices. It should be appreciated that all or part of the various devices, processes, or methods described herein may be implemented using any combination of hardware, firmware, and/or software.

As described above, various techniques and structures are provided herein that may be used to reduce the memory requirements for implementing RING and/or other forms of network coding. These techniques and structures may also, or alternatively, be capable of significantly reducing the computational complexity and/or power consumption associated with the use of RLNC and/or other forms of network coding. In various implementations, these techniques may involve a limitation in a number of packets that may be stored in a node device for use in the performance of coding operations when forwarding packets in a network or system. For example, instead of storing every received packet for use in coding, a node device may be limited to the storage of a finite number of packets (e.g., S packets, where S is a positive integer). When a new packet is received by a node device, instead of storing the new packet directly in a local memory for use in network coding operations, the device may linearly combine the new packet with S packets already stored in the memory. This technique may be referred to herein as finite memory random linear network coding (FM-RLNC). Different techniques for performing the linear combination may be used. Two variants of the RLNC technique that will be described herein are accumulator FM-RLNC and recombinator FM-RLNC. When a packet is to be transmitted from an FM-RLNC enabled node, only S packets may need to be read from a memory to generate the coded packet to be transmitted. For this reason, the memory requirements and computational complexity of the coding operation may be greatly reduced over prior network coding strategies.

Figure 3:
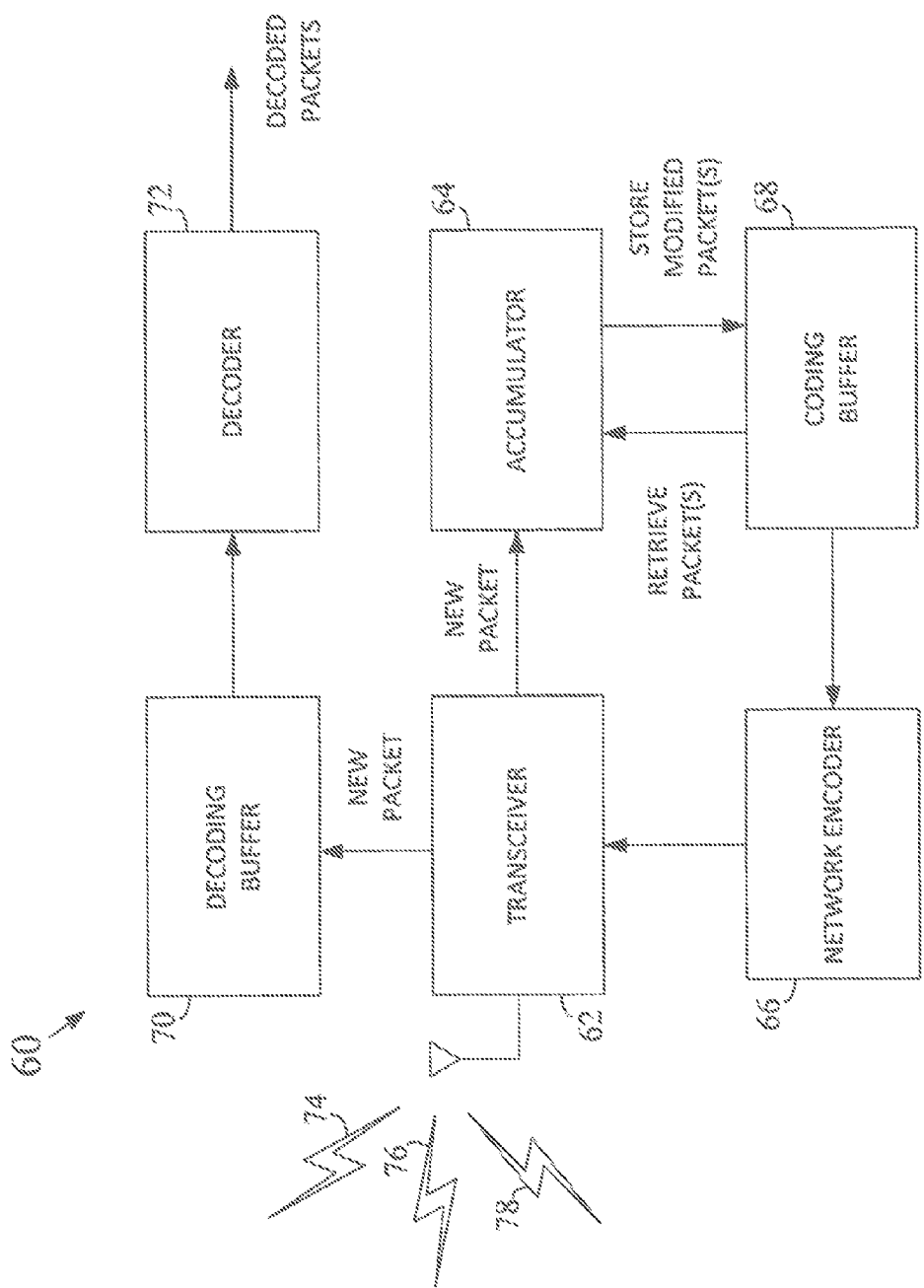
FIG. 3 is a block diagram illustrating an example processing arrangement that may be used within a node device to perform accumulator FM RLNC in an implementation.

FIG. 3 is a block diagram illustrating an example processing arrangement 60 within a node device that may be used to perform accumulator FM RLNC in an implementation. As illustrated, the processing arrangement 60 may include: a transceiver 62, an accumulator 64, a network encoder 66, a coding buffer 68, a decoding buffer 70, and a decoder 72. In the illustrated embodiment, transceiver 62 is a transceiver that is capable of receiving packets from and transmitting packets to a surrounding environment. In other implementations, another form of communication device may be used to send and receive packets. Coding buffer 68 is used to store information for use in network coding operations to generate packets to be forwarded from transceiver 62 to other nodes. Decoding buffer 70 is used to store received packets for eventual decoding within the node. In nodes of the past that implemented network coding, a single memory resource was typically used to store packets for use in both network coding operations and decoding operations. As will become apparent, the use of different memory resources to perform the two functions may permit a significant reduction in processing complexity during network coding operations.

In at least one implementation, coding buffer 68 is limited to storing a finite number of active packets (e.g., S packets) for use in coding operations. Accumulator 64 is operative for updating the S packets stored in coding buffer 68 when a new packet is received by transceiver 62. If there are less than S packets stored in coding buffer 68 when transceiver 62 receives a new packet, accumulator 64 may simply store the new packet directly in coding buffer 68. However, if S packets are already stored, accumulator 64 will update the S stored packets by linearly combining the new packet with the stored packets. For example, if S=5, and the currently stored packets are identified as $P_1$, $P_2$, $P_3$, $F_4$, and $P_5$, then accumulator 64 may update the stored packets as follows in one implementation:

$$P_1' = P_1 + \alpha_1 P_{new}$$

$$P_2' = P_2 + \alpha_2 P_{new}$$

$$P_3' = P_3 + \alpha_3 P_{new}$$

$$P_4' = P_4 + \alpha_4 P_{new}$$

$$P_5' = P_5 + \alpha_5 P_{new}$$

where $P_1'$, $P_2'$, $P_3'$, $P_4'$, and $P_5'$ are the updated packets; $P_{new}$ is the new packet; and $\alpha_1$, $\alpha_2$, $\alpha_3$, $\alpha_4$, and $\alpha_5$ are randomly generated coefficients. A random number generator may be used to generate the random coefficients.

To perform the updates, accumulator 64 may retrieve all S stored packets from coding buffer 68, modify the packets, and then store the modified packets in coding buffer 68. To further reduce complexity and memory requirements, however, accumulator 64 may in some implementations modify the stored packets one at a time. For example, accumulator 64 may first retrieve stored packet and then modify the packet by adding $\alpha_1 P_{new}$ to generate a coded packet $P_1'$. Accumulator 64 may then store the coded packet $P_1'$ in coding buffer 68 before retrieving the next packet $P_2$ for modification, and so on. In this manner, accumulator 64 may only require storage for a single packet to perform the buffer updates (i.e., to store the packet being modified). The complexity of this approach is $\theta(S)$. Thus, a relatively simple processor may be used to perform the updates. In addition, because coding buffer 68 is limited to storing a finite number of active packets, a faster, lower capacity form of memory may be used. For example, if the node device architecture 40 of FIG. 2 is used, fast memory 44 may be used for coding buffer 68 rather than the higher capacity slow memory 48. In network coding enabled devices of the past that stored all received packets for use in network coding, a higher capacity slower form of memory was invariably used to store received packets for coding purposes.

Network encoder 66 is operative for performing the network encoding required when a packet needs to be transmitted by transceiver 62. Network encoder 66 may, for example, retrieve the S packets from coding buffer 68 and linearly combine the packets using randomly generated coefficients to generate a new packet. In some implementations, network encoder 66 may then append the set of coefficients to the coded packet before delivering it to transceiver 62 for transmission. Because only a fixed, finite number of packets are retrieved and combined, computational complexity may be significantly less then prior techniques. For example, as described previously, past systems stored every received packet for use in coding operations. When these packets where combined during a coding operation, a random number generator may have been called upon to generate a random number for each of the stored packets. Using FM-RLNC, the number of random numbers that need to be generated during a coding operation are greatly reduced, further reducing computational complexity.

As described above, when transceiver 62 receives a new packet, it may send the packet to accumulator 64 for use in updating a finite number of packets in coding buffer 68. In addition, the new packet may be delivered to decoding buffer 70 to be stored for later decoding. Unlike coding buffer 68, decoding buffer 70 may store all packets received by transceiver 62 for use in decoding. As such, in some implementations, decoding buffer 70 may utilize a slower, higher capacity form of memory within a node device (e.g., slow memory 48 of FIG. 2), while coding buffer 68 may utilize a faster, lower capacity form of memory (e.g., fast memory 44 of FIG. 2). When sufficient data is stored in decoding buffer 70, decoder 72 may decode the data to recover messages originally transmitted in the network. Techniques for decoding data using network encoded packets (included RLNC encoded packets) are well blown in the art. If a node is not interested in decoding messages, then updates to decoding buffer 70 may be suspended. If a node is never interested in decoding messages (e.g., in some situations, a node may only serve as a relay node), decoding buffer 70 and decoder 72 may not be needed. In these cases, a simpler and less expensive node device may be used.

In some implementations, the node device of FIG. 3 is adapted for use in an arbitrary network where input may be received from any arbitrary direction. For example, with reference to FIG. 3, packets may be received from remote nodes over any of a variety of different links 74, 76, 78. In addition, the location of the remote nodes may change with time. In some embodiments, pre-established routing is not used. The node device of FIG. 3 may simply act as a relay for a received packet, receiving it from an arbitrary source node and then broadcasting a coded packet in response thereto. Therefore, in some embodiments, the node device may not know from where it will receive a next packet or to where a next coded packet will be transmitted. In some implementations, the node device of FIG. 3 may be adapted to act as both a relay node and a destination node. In such an implementation, the node device of FIG. 3 may store received packets in decoding buffer 70 for eventual decoding. In some embodiments, a node device may be capable of simultaneously serving as two or more of: a source node, a destination node, and a relay node.

Figure 4:
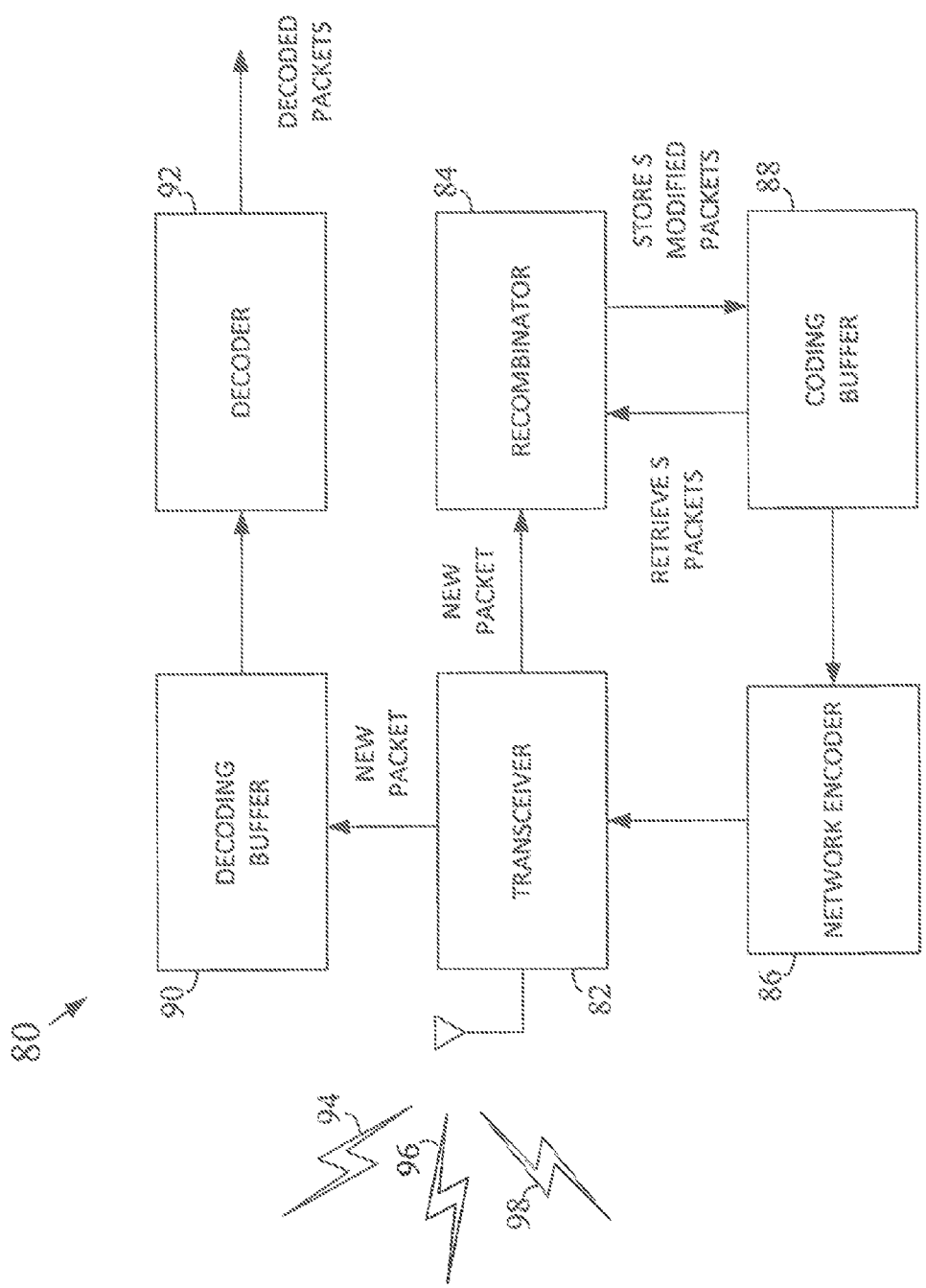
FIG. 4 is a block diagram illustrating an example processing arrangement that may be used within a node device to perform recombinator FM RLNC in an implementation.

FIG. 4 is a block diagram illustrating an example processing arrangement 80 within a node device that may be used to perform recombinator E RING in an implementation. As illustrated, the processing arrangement 80 may include: a transceiver 82, a recombinator 84, a network encoder 86, a coding buffer 88, a decoding buffer 90, and a decoder 92. Thus, the processing arrangement 80 of FIG. 4 is similar to the arrangement 60 of FIG. 3, but with accumulator 64 replaced by recombinator 84. Coding buffer 88 may again be limited to a finite number of active packets (i.e., packets). Recombinator 84 is operative for updating the S packets stored in coding buffer 88 when a new packet is received by transceiver 82. As with accumulator 64 discussed previously, if there are less than S packets stored in coding buffer 88 when transceiver 82 receives a new packet, recombinator 84 may simply store the new packet directly in coding buffer 68. However, if S packets are already stored, recombinator 84 may update the S stored packets using random linear combinations. For example, if S=5, and the currently stored packets are identified as $P_1$, $P_2$, $P_3$, $P_4$, and $P_5$, then recombinator 84 may update the stored packets as follows in one implementation:

$$P_1'=\alpha_{11}P_1+\alpha_{12}P_2+\alpha_{13}P_3+\alpha_{14}P_4+\alpha_{15}P_5+\beta_1 P_{new}$$

$$P_2'=\alpha_{21}P_1+\alpha_{22}P_2+\alpha_{23}P_3+\alpha_{24}P_4+\alpha_{25}P_5+\beta_2 P_{new}$$

$$P_3'=\alpha_{31}P_1+\alpha_{32}P_2+\alpha_{33}P_3+\alpha_{34}P_4+\alpha_{35}P_5+\beta_3 P_{new}$$

$$P_4'=\alpha_{41}P_1+\alpha_{42}P_2+\alpha_{43}P_3+\alpha_{44}P_4+\alpha_{45}P_5+\beta_4 P_{new}$$

$$P_5'=\alpha_{51}P_1+\alpha_{52}P_2+\alpha_{53}P_3+\alpha_{54}P_4+\alpha_{55}P_5+\beta_5 P_{new}$$

where $P_1'$, $P_2'$, $P_3'$, $P_4'$, and $P_5'$ are the updated packets; $P_{new}$ is the new packet; and $\alpha_{11}, \ldots, \alpha_{15}$; $\alpha_{21}, \ldots, \alpha_{25}$; $\alpha_{31}, \ldots, \alpha_{35}$; $\alpha_{41}, \ldots, \alpha_{45}$; $\alpha_{51}, \ldots, \alpha_{55}$; and $\beta_1, \ldots, \beta_5$ are randomly generated coefficients. Other linear combination techniques may be used in other implementations. A random number generator may be used to generate the random coefficients.

To perform the updates, recombinator 84 may retrieve all S stored packets from coding buffer 88, modify the packets, and then store the modified packets in coding buffer 88. As will be appreciated, this technique may be more computationally complex than the accumulator FM RLNC variant described previously in connection with FIG. 3. However, this approach is still much less complex than traditional RING. For example, this technique may be shown to have a complexity of $\theta(S^2)$, while traditional RLNC has a complexity of $\theta(k)$ where k is the number of transmitted messages. As described previously, if a node is not interested in decoding messages, then decoding buffer 90 and decoder 92 may be optional.

In some implementations, the number of packets S stored in a coding buffer of a node may be varied over time. In general, the selection of a value for S may involve a tradeoff between performance and computational complexity. For example, higher values of S may result in improved performance and lower values of S may result in lower complexity. In at least one implementation, S may adapt with time to changing network conditions. For example, the value of S may adapt based on traffic conditions in the network, in one possible approach, two different values of S ($S_1$ and $S_2$) may be used. The first value $S_1$ may be used when more consistent traffic exists in the network and the second value $S_2$ may be used if traffic becomes bursty. Additional values may also be specified. Other techniques for varying the value of S used by a node during network operation may alternatively be used.

In some implementations, the node device of FIG. 4 is adapted for use in an arbitrary network where input may be received from any arbitrary direction. For example, with reference to FIG. 4, packets may be received from remote nodes over any of a variety of different links 94, 96, 98. In addition, the location of the remote nodes may change with time, in some embodiments, pre-established routing is not used. The node device of FIG. 4 may simply act as a relay for a received packet, receiving it from an arbitrary source node and then broadcasting a coded packet in response thereto. In some implementations, the node device of FIG. 4 may be adapted to act as both a relay node and a destination node. In such an implementation, the node device of FIG. 4 may store received packets in decoding buffer 90 for eventual decoding.

Figure 5:
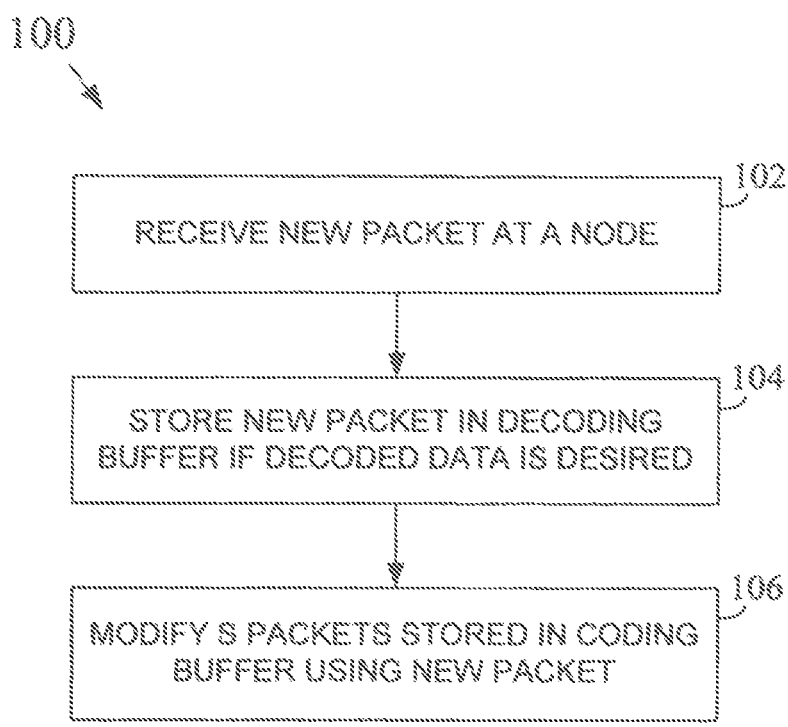
FIG. 5 is a flowchart illustrating a method for use in supporting FM-RLNC within a node device in an implementation.

FIG. 5 is a flowchart illustrating a method 100 for use in supporting FM-RLNC within a node device in an implementation. A new packet is first received at a node (block 102). If data decoding is desired, the new packet may be stored within a decoding buffer of the node (block 104). If there are already S packets stored within the coding buffer, the new packet may then be linearly combined with the S packets in the buffer (block 106). Any of a variety of different approaches may be used to perform the linear combination. For example, as discussed previously, an accumulator FM-RLNC approach may be used where, for each of S stored packets, a linear combination of the new packet and the stored packet is made to generate a combined packet to be stored in the corresponding memory location. In another possible implementation, a recombinator FM-RLNC approach may be used where, for each of the S stored packets, a random linear combination of all S stored packets and the new packet is made. Other techniques for modifying the S packets stored in the coding buffer may alternatively be made. When a transmission is to be made by the node device, the packet data within the coding buffer may be retrieved and linearly combined to form a coded packet for transmission. In at least one approach, a randomly generated coefficient may be generated for each of the retrieved packets to be used in the combination. A list of the coefficients used to perform the coding may, in some implementations, be included with the coded packet for possible use during a future decoding operation at a destination node.

In the description above, various implementations and variations have been discussed in the context of multicast or broadcast transmission within a communication network. It should be appreciated, however, that the described techniques and structures also have application in a unicast transmission scenario. In addition, the techniques and structures also have application in systems not typically considered communications networks, such as digital data storage systems that store information in a distributed manner. As described previously, the techniques discussed herein have application in both wireless and wired systems.

The techniques and structures described herein may be implemented in any of a variety of different forms. For example, features of the invention may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method for operating a network node in a network having a plurality of nodes, where the network does not use pre-established network routing to direct packets through the network from a source node to a destination node, the method comprising:
   receiving a new packet at the network node from an arbitrary direction;
   when a maximum number of packets is already stored in a coding buffer:
      retrieving a first packet from the coding buffer, linearly combining the new packet with the first packet to generate a first modified packet, and storing the first modified packet in the coding buffer in a memory location associated with the first packet;
   when a maximum number of packets is not already stored in the coding buffer:
      storing the new packet in the coding buffer;
   generating one or more coded packets to be transmitted from the network node by linearly combining one or more packets stored in the coding buffer using network coding; and
   transmitting the coded packet to one or more destination nodes without using pre-established network routing.

2. The method of claim 1, wherein:
   generating the first modified packet comprises linearly combining the new packet with a plurality numbering S packets stored in the coding buffer to generate up to S modified packets, and
   storing the first modified packet comprises storing the up to S modified packets in the coding buffer.

3. The method of claim 2, wherein S is the maximum number of packets that can be stored in the coding buffer.

4. The method of claim 1, further comprising, when a maximum number of packets is already stored in the coding buffer:
   retrieving a second packet from the coding buffer;
   linearly combining the new packet with the second packet to generate a second modified packet; and
   storing the second modified packet in the coding buffer in a memory location associated with the second packet.

5. The method of claim 1, wherein the network comprises a wireless mesh network.

6. The method of claim 1, wherein the network comprises a digital data storage system configured to store data in a distributed manner across the plurality of network nodes.

7. The method of claim 1, further comprising storing the new packet in a decoding buffer that is different from the coding buffer in response to receiving the new packet at the network node, the decoding buffer for use in decoding data at the network node.

8. The method of claim 2, further comprising, when a maximum number of packets is already stored in the coding buffer:
   linearly combining the new packet with the plurality numbering S packets to generate a second modified packet; and
   storing the second modified packet in the coding buffer in a memory location associated with one of the plurality numbering S packets.

9. The method of claim 4, wherein the first modified packet is stored within the first memory location before linearly combining the new packet with the second packet.

10. A node device for use in a network having a plurality of nodes that does not use pre-established routing to direct packets through the network, comprising:
    a receiver configured to receive data packets from any arbitrary direction in the network;
    a coding buffer configured to store a maximum number of received data packets for use in network coding;
    a controller comprising an accumulator configured to modify contents of the coding buffer when a new data packet is received,
    wherein when the maximum number of received packets is already stored in the coding buffer, the accumulator is configured to linearly combine the new data packet with a data packet previously stored in a first memory location of the coding buffer to generate a first modified data packet, and to store the first modified packet in the first memory location, and
    wherein when the maximum number of received packets is not already stored in the coding buffer, the accumulator is configured to store the new data packet in the coding buffer;
    a network encoder configured to generate, using network coding, a coded packet for transmission from the node device using packet data stored in the coding buffer; and
    a transmitter configured to transmit the coded packet to one or more other destination nodes without using pre-established network routing.

11. The node device of claim 10, wherein the accumulator is configured to linearly combine the new data packet with a data packet previously stored within a second memory location of the coding buffer to generate a second modified data packet and to store the second modified data packet within the second memory location in place of the data packet previously stored within the second memory location.

12. The node device of claim 11, wherein the accumulator is configured to store the first modified data packet within the first memory location before the accumulator linearly combines the new data packet with the data packet previously stored within the second memory location.

13. The node device of claim 10, wherein the controller comprises a recombinator configured to linearly combine the new data packet with a plurality numbering S data packets stored within the coding buffer to generate up to S modified data packets and to store the up to S modified data packets within the coding buffer.

14. The node device of claim 13, wherein the recombinator is configured to linearly combine the new data packet with the plurality numbering S data packets to generate a second modified data packet and to store the second modified data packet within a second memory location of the coding buffer.

15. The node device of claim 10, further comprising:
    a decoding buffer configured to store received packets for use in data message decoding, the decoding buffer being different from the coding buffer; and
    a decoder configured to generate decoded packets using data stored in the decoding buffer.

16. The node device of claim 13, wherein S is the maximum number of received packets.

17. A non-transitory machine-readable storage medium, having encoded thereon program code, wherein, when the program code is executed by a machine, the machine implements a method for operating a node in a network having a plurality of nodes that does not use pre-established routing to direct data packets through the network, the method comprising:
  receiving a new packet at the node from an arbitrary direction;
  when a maximum number of packets is already stored in a coding buffer:
    retrieving a first packet from the coding buffer, linearly combining the new packet with the first packet to generate a first modified packet, and storing the first modified packet in the coding buffer in a memory location associated with the first packet;
  when a maximum number of packets is not already stored in the coding buffer:
    storing the new packet in the coding buffer;
  generating one or more coded packets to be transmitted from the node by linearly combining data stored in the coding buffer using network coding; and
  transmitting the coded packet from the node to one or more destination nodes without using pre-established network routing.

18. The non-transitory machine-readable storage medium of claim 17, wherein:
  generating the first modified packet comprises linearly combining the new packet with a plurality numbering S packets stored in the coding buffer to generate up to S modified packets; and
  storing the first modified packet comprises storing the up to S modified packets in the coding buffer.

19. The non-transitory machine-readable storage medium of claim 18, wherein S is the maximum number of packets that can be stored in the coding buffer.

20. The non-transitory machine-readable storage medium of claim 7, further comprising, when a maximum number of packets is already stored in the coding buffer:
  retrieving a second packet from the coding buffer;
  linearly combining the new packet with the second packet to generate a second modified packet; and
  storing the second modified packet in the coding buffer in a memory location associated with the second packet.

21. The non-transitory machine-readable storage medium of claim 17, wherein the method further comprises storing the new packet in a decoding buffer that is different from the coding buffer for use in decoding data at the node.

22. The non-transitory machine-readable storage medium of claim 18, wherein the method further comprises, when a maximum number of packets is already stored in the coding buffer:
  linearly combining the new packet with the plurality numbering S packets to generate a second modified packet; and
  storing the second modified packet in the coding buffer in a memory location associated with one of the plurality numbering S packets.

23. A node device for use in a network having a plurality of node devices, each node device of the plurality of node devices comprising at least one of a source node, a destination node, and a relay node to relay packets between source nodes and destination nodes, each node device comprising:
  a coding buffer configured to store received packets and generate new packets, the coding buffer having a fixed number of memory locations that can be used for storing packets for use in network coding operations;
  a controller comprising an accumulator configured to modify contents of the coding buffer when a new data packet is received from the network,
  wherein when a maximum number of packets is already stored in the coding buffer, the accumulator is configured to linearly combine the new data packet with a packet previously stored in a first memory location of the coding buffer to generate a first modified data packet, and to store the first modified data packet in the coding buffer in the first memory location, and
  wherein when the maximum number of packets is not already stored in the coding buffer, the accumulator is configured to store the new data packet in the coding buffer; and
  a decoding buffer configured to store received packets for use in decoding operations, the decoding buffer being different from the coding buffer, wherein the decoding buffer is configured to store each new packet received by the node device for use in decoding operations with no fixed limit on the number of memory locations that can be used for decoding;
  wherein the node device is capable of concurrent operation as two or more of: a source node, a relay node, and a destination node.

24. The node device of claim 23, wherein:
  the accumulator is configured to linearly combine the new data packet with a data packet previously stored within a second memory location of the coding buffer to generate a second modified data packet and to store the second modified data packet within the second memory location in place of the data packet previously stored within the second memory location.

25. The node device of claim 23, wherein the controller comprises a recombinator to linearly combine the new data packet with a plurality numbering S data packets stored within the coding buffer to generate up to S modified data packets and to store the up to S modified data packets within the coding buffer.

26. The node device of claim 25, wherein the recombinator is configured to linearly combine the new data packet with the plurality numbering S data packets to generate a second modified data packet and to store the second modified data packet within a second memory location of the coding buffer.

27. The node device of claim 25, wherein S is the maximum number of received packets.

28. The node device of claim 24, wherein the accumulator is configured to store the first modified data packet within the first memory location before the accumulator linearly combines the new data packet with the data packet previously stored within the second memory location.

* * * * *